United States Patent [19]

Ritz

[11] Patent Number: 5,147,439
[45] Date of Patent: Sep. 15, 1992

[54] VARIABLE PRESSURE GAS JET SYSTEM FOR LIFTING AND FORMING GLASS SHEETS

[75] Inventor: Gregory Ritz, Sylvania, Ohio
[73] Assignee: Glasstech, Inc., Perrysburg, Ohio
[21] Appl. No.: 517,166
[22] Filed: May 1, 1990
[51] Int. Cl.$^5$ .............................................. C03B 23/035
[52] U.S. Cl. ........................................ 65/158; 65/160; 65/182.2; 65/273; 65/DIG. 13; 137/495; 364/473; 364/476
[58] Field of Search ...................... 65/25.4, 25.2, 158, 65/160, 161, 182.2, 273, DIG. 13; 417/187, 189; 364/473, 476; 137/495, 505.14, 906

[56] References Cited

U.S. PATENT DOCUMENTS

| | | |
|---|---|---|
| 3,806,312 | 4/1974 | McMaster et al. . |
| 3,934,970 | 1/1976 | McMaster et al. . |
| 3,947,242 | 3/1976 | McMaster et al. . |
| 4,204,854 | 5/1980 | McMaster et al. . |
| 4,222,763 | 9/1980 | McMaster . |
| 4,294,214 | 10/1981 | Treible et al. ............... 137/495 |
| 4,356,018 | 10/1982 | McMaster . |
| 4,386,952 | 6/1983 | Nitschke . |
| 4,475,937 | 10/1984 | Nitschke . |
| 4,661,141 | 4/1987 | Nitschke et al. . |
| 4,782,449 | 11/1988 | Brinker et al. . |
| 4,825,376 | 4/1989 | Brinker et al. . |

Primary Examiner—Joye L. Woodard
Attorney, Agent, or Firm—Brooks & Kushman

[57] ABSTRACT

A variable pressure gas jet system for lifting and forming glass sheets including a controller (32) for providing an electrical signal corresponding to a preselected pressure to an electrical-to-pressure converter (34) which converts the received signal to a corresponding pressure. A remotely operated gas flow regulator (36) receives a small volume of the pressurized gas from the converter and transmits a large volume of gas at a corresponding pressure through the system to a series of gas jets (42) comprising an array of nozzles (24) which direct the pressurized gas onto the lower surface of the heated glass sheet to lift the glass sheet from a conveyor to the downwardly facing surface of an upper mold (22). The control preferably comprises a computer including a microprocessor and adequate memory for retaining a series of preselected pressures and preselected process intervals which together define a profile of varying pressures suitable to softly lift the heated glass sheet from the furnace conveyor (16) into contact with the upper mold (22), form the glass sheet on the mold (22), and subsequently provide support for the formed glass sheet on an open-center transfer ring to abate the effects of gravity which cause the formed glass sheet to sag from its desired shape during transport from the bending station (14) in the furnace (10).

2 Claims, 3 Drawing Sheets

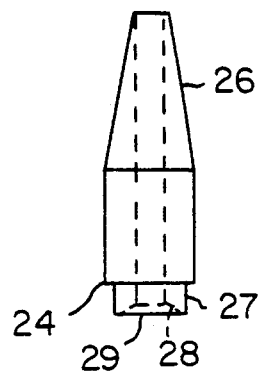
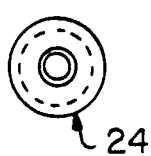
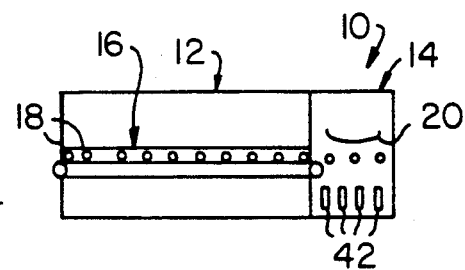
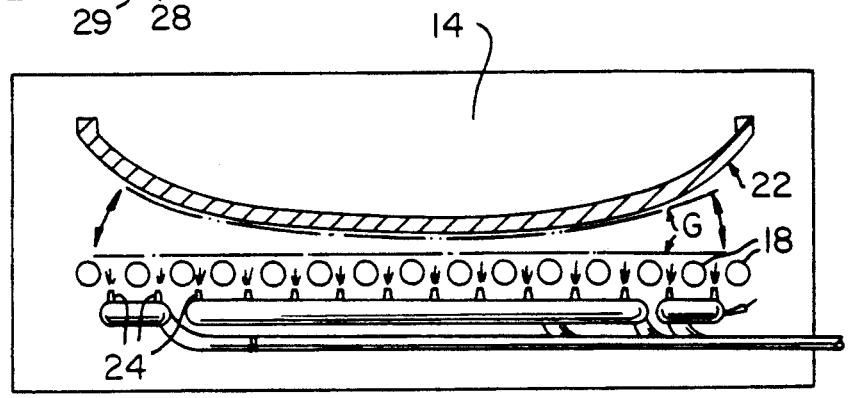
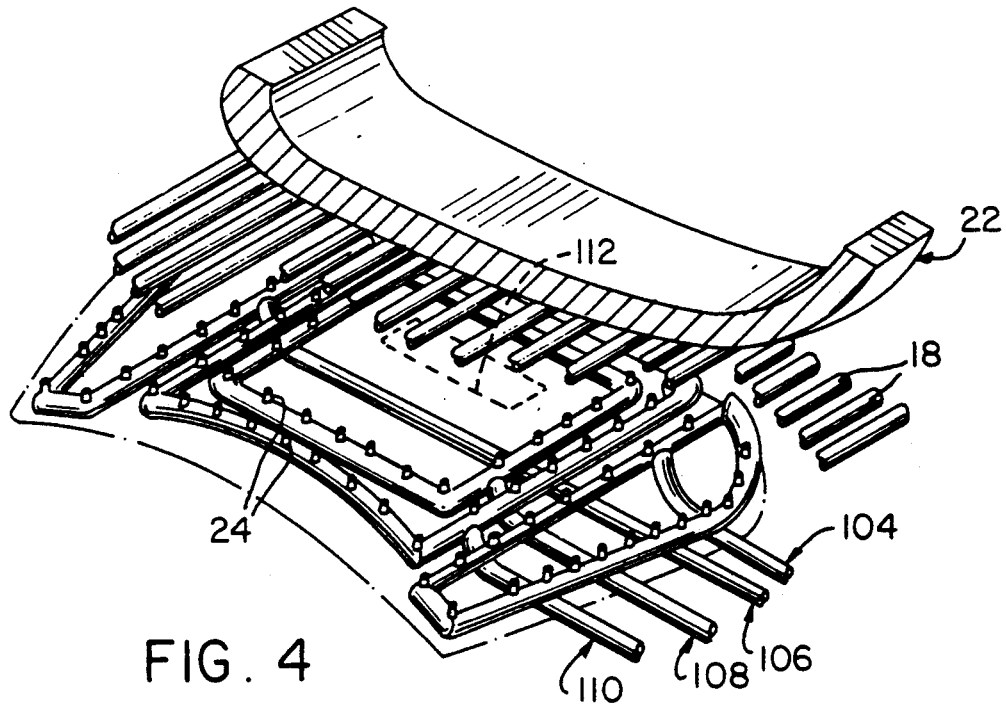

FIG. 2
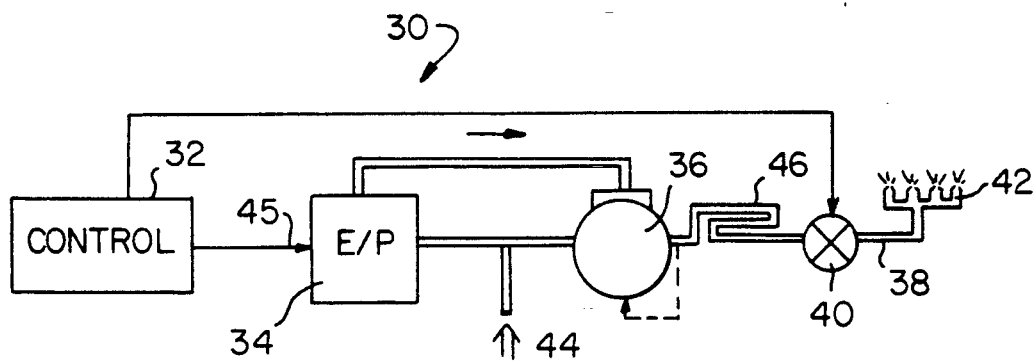
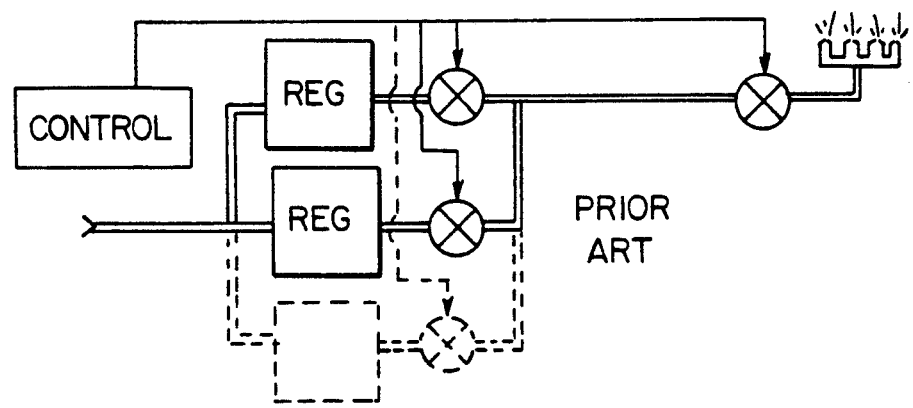
FIG. 8

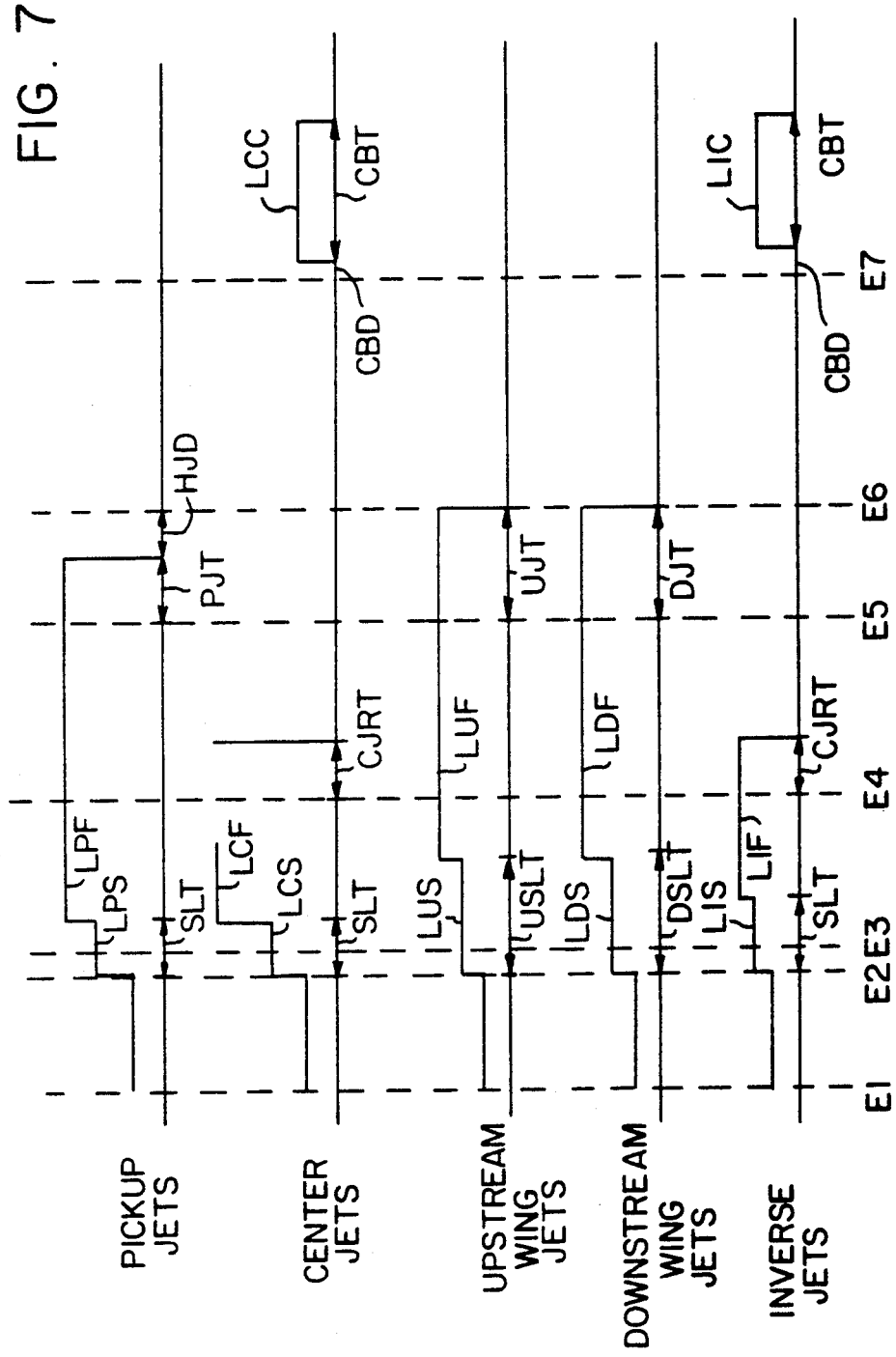

VARIABLE PRESSURE GAS JET SYSTEM FOR LIFTING AND FORMING GLASS SHEETS

TECHNICAL FIELD

This invention relates to furnaces for heating and press bending glass sheets.

BACKGROUND ART

Bent glass sheets are used extensively for vehicle windshields, side windows, and rear windows, as well as in various architectural applications. The bent sheets are also frequently tempered to improve the mechanical strength of the glass. In the United States, tempered bent glass sheets are used on vehicle side and rear windows while annealed bent glass sheets laminated to each other by polyvinyl butyryal are used for vehicle windshields. In other countries, tempered bent glass sheets are used for vehicle windshields as well as for side and rear windows.

Glass sheet press bending is typically performed by pressing a heated glass sheet on a mold, or between complementary curved molds so that the heated glass sheet is bent to conform to the curved shape of the mold or molds. One type of press bending system is disclosed in U.S. Pat. No. 4,661,141, which discloses a glass sheet press bending system including a horizontal conveyor on which glass sheets are conveyed in a generally horizontally extending orientation for heating, and also includes an upper mold having a downwardly facing curved shape located above the conveyor at a bending station. When a glass sheet is conveyed into the bending station, a vacuum drawn at the upper mold and/or upward gas flow from below the conveyor provide a preferred means for supplying a differential gas pressure to the heated glass sheet so as to lift the glass sheet upwardly off the conveyor against the downwardly facing surface of the mold and, preferably, to provide some or all of the bending required to conform the glass sheet to the shape of the mold surface. A lower mold having an upwardly facing, complementary curved shape is typically mounted for movement into position directly below the upper mold, and for subsequent movement upwardly to press bend the heated glass sheet between the upper and lower mold. A transfer mold is thereafter moved horizontally under the upper mold and receives the press bent glass for subsequent transfer therefrom. Normally, the transfer mold is formed as an open-center ring and transfers the press bent glass to a quench station where tempering is performed. This type of press bending system can be utilized with either a gas hearth or a roller-type conveyor.

These systems typically employed a gas jet system generally of the type illustrated in FIG. 8 for providing positive gas pressure on the underside of the glass sheet for lifting the glass from the conveyor and blowing it to the upper forming mold. A control signal opened a "cold valve" solenoid which supplied pressurized air to a heat exchanger (not shown) in the furnace. The pressure level for the pressurized air was set on a pressure regulator. The heated high pressure air was then released to the lift jets by opening a "hot valve" solenoid, thereby lifting the glass from the rolls and blowing it to the forming mold.

This system provided adequate though minimal control of the lift jet forces by providing one or more preset forced levels of pressurized air to the system. However, since the action of the lift jets could be controlled only by turning on and off the hot valve or cold valve, the system operated at a single, pre-set pressure. To change the lifting force for bending a different shape, the regulator required adjustment during initial set-up of the system for that shape.

Another problem with the previous system was that upon opening the cold valve, and prior to opening the hot valve, significant excess pressure often built-up in the pressurized gas in the heat exchanger so that, upon opening the hot valve to lift up the glass sheet, the initial surge of pressurized gas was greater than the desired force, causing damage to the protective covering on the mold or breakage of the glass sheet.

Also, if a different lifting force was needed during a different stage in a glass sheet press bending cycle, a second bypass regulator and bypass cold valve would need to be installed. Likewise, additional bypass regulators and bypass cold valves (shown as phantom lines in FIG. 8) would need to be installed for each different lifting force required during the process.

DISCLOSURE OF INVENTION

An object of the present invention is to provide a variable pressure gas jet system that receives a heated glass sheet from a horizontal conveyor and quickly provides accurate and quickly varying gas pressure on the underside of the heated glass sheet to quickly but softly blow the glass sheet from the conveyor to the upper forming mold.

Another object of the present invention is to provide a variable pressure gas jet system capable of providing variable controlled gas at relatively higher pressures than the gas pressure used to lift the glass sheet to the mold to assist in forming the heated glass sheet on selected areas of the mold.

Another object of the present invention is to provide a variable pressure gas jet system capable of delivering a preselected, relatively lower pressure than the lifting pressure to the glass sheet as it is dropped into, and transported within, the open center transfer ring to reduce the effect of gravity which tends to cause the formed glass to sag from its desired shape.

In carrying out the above objects, the variable pressure gas jet system of the present invention includes a controller for providing an electrical signal corresponding to a preselected pressure to an electrical-to-pressure converter which converts the received signal to a corresponding pressure. A remotely operated gas flow regulator receives a small volume of the pressurized gas from the converter and transmits a large volume of gas at a corresponding pressure through the system to a series of gas jets comprising an array of nozzles which direct the pressurized gas onto the lower surface of a heated glass sheet to lift the glass sheet from a conveyor to the downwardly facing surface of an upper mold.

The control preferably comprises a computer including a microprocessor and adequate memory for retaining a series of preselected pressures and preselected process intervals which together, define a profile of varying pressures suitable to softly lift the heated glass sheet from the conveyor into contact with the upper mold, form the glass sheet on the mold, and subsequently provide support for the formed glass sheet on an open-center transfer ring to abate the effects of gravity which cause the formed glass sheet to sag from its desired shape during transport from the bending station.

The preferred embodiment of the present invention includes a heat exchanger and a "hot valve", each respectively located downstream of the regulator and upstream of the gas jets to provide preheating of the pressurized gas. The hot valve is automatically opened or closed at preselected times by the controller to quickly provide infinitely varying preselected gas jet force throughout the glass sheet bending cycle.

The most preferred construction of the present invention includes a plurality of independent arrays of gas jet nozzles configured to provide pressure on a particular portion of the surface of the glass sheet, wherein the computer provides independent control of each array of gas jet nozzles according to a specific pressure-time profile during the glass sheet bending process.

The objects, features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic side elevational view of a glass sheet processing system including a horizontal roller conveyor furnace and bending station incorporating the variable pressure gas jet system for lifting and forming glass sheets in accordance with the present invention;

FIG. 2 is a schematic view of the variable pressure gas jet system;

FIG. 3 is a schematic side elevational view of the bending section of the glass sheet processing system of FIG. 1;

FIG. 4 is a perspective view of the array of gas jet nozzles utilized with the lifting arrangement of FIG. 1;

FIGS. 5 and 6 illustrate the gas jet nozzles utilized in the preferred embodiment of the present invention;

FIG. 7 is a chart illustrating typical time-pressure profiles utilized in forming a glass sheet in accordance with the present invention; and FIG. 8 is a schematic view of a prior gas jet system.

BEST MODES FOR CARRYING OUT THE INVENTION

Referring to FIG. 1 of the drawings, the variable pressure gas jet system of the present invention is preferably incorporated in a glass sheet bending furnace generally indicated by 10. Apparatus 10 includes a heating chamber 12 for providing a heated ambient for heating glass sheets. A conveyor 16 includes horizontally extending rolls 18 for conveying glass sheets G through the heating chamber 12 for heating to a desired temperature for processing at a press bending station 14. The conveyor 16 is preferably of the type including rolls 18 that frictionally driven in the manner disclosed by U.S. Pat. Nos. 3,806,312; 3,934,970; 3,947,242; and 3,994,711. The press bending station 14 includes an upper mold 20 located above the conveyor 16 and having a downwardly facing curved shape that is defined by a curved surface 22 as illustrated in FIG. 4. The furnace 10 also preferably includes a lower mold (not shown) that has an upwardly facing curved shape, which lower mold is mounted for horizontal movement by an actuator into position below the upper mold 20 for bending the glass sheet G between the upper mold 20 and the lower mold. The furnace 10 also preferably includes a transfer mold (not shown) having a curved shape corresponding to the curved shape of the bent glass sheet, positionable between the raised upper mold 20 and the conveyor 16 for receiving the bent glass sheet and transporting it to a subsequent processing station, such as a quench. A preferred glass sheet bending furnace of the type generally described herein is more fully disclosed in U.S. Pat. No. 4,661,141, which is hereby incorporated by reference into the disclosure of the present system.

Referring to FIG. 2, the variable pressure gas jet system of the present invention, generally referred to as 30, includes a control 32 for providing electrical signals corresponding to preselected desired gas pressures to the system, an electrical-to-pressure converter 34 connected to the output of the control for receiving the electrical signal from the control and generating a gas pressure corresponding to that electrical signal, a remotely controlled gas pressure regulator 36 including an input for receiving the pressurized gas transmitted from the converter 34 and an output for transmitting pressurized gas which varies as a function of the gas pressure sensed from the converter 34 through the conduits 38 of the system to a plurality of gas jets 42 in the bending station 14 of the furnace 10.

The system 30 of the present invention also preferably includes a heat exchanger 46, typically in the form of a length of pipe located in the furnace 12 of a sufficient length to allow for heating of the pressurized gas to a desired temperature prior to impingement by the gas on the glass sheet at the bending station 14. The system 30 of the present invention also preferably includes a hot valve 40 positioned downstream from the heat exchanger 46 and relatively closer to the gas jets 42 in the bending station 14, which hot valve 40 is controlled via an on/off signal from the control 32 to quickly release the pressurized gas to the gas jets 42 during the glass sheet bending process. A source 44 of pressurized gas is located externally of the heating chamber 12 and communicates with the converter 34 and the remotely operated regulator 36.

In the preferred embodiment, the control 32 for the system 30 is a computer including a microprocessor and memory sufficient to store a series of variables corresponding to preselected pressures, process times, and events germane to the glass bending process. The microprocessor is preferably Motorola Model No. 6809. The remaining hardware required for the computer control of the preferred embodiment is more specifically disclosed in U.S. Pat. Nos. 4,782,449 and 4,825,376.

The microprocessor is preferably suitably programmed to monitor various selected conditions in the glass bending process, and generates signals in response to monitored conditions which vary the gas pressure transmitted to the gas jets 42 according to preselected pressure values at preselected times during glass sheet bending and transport from the bending station 14.

The electrical-to-pressure converter 34 is preferably capable of generating a low flow pneumatic pressure varying from 0 to 100 psi in response to a 0-10 volt signal received by the converter at its first input 45. One type of electrical-to-pressure converter which may be used is manufactured by the Norgren Company of Littleton, Colo. The remotely controlled regulator 36 is preferably manufactured by Norgren. The regulator 36 is connected at its inlet port to receive the gas pressure output from the converter 34. Upon sensing the 0-100 psi pressure at its inlet port, the regulator 36 generates a corresponding pressure at greatly amplified flow rate through its output to supply the gas jets 42.

In the preferred embodiment, for example, the electrical-to-pressure converter 34 may transmit gas at 50 psi at a mass flow rate of 0.1 standard cubic feet per minute (SCFM), while the remotely operated regulator 36 will, as a result, generate gas at a pressure of 50 psi and flow rate of over 100 SCFM. For greater accuracy, it is preferable that the regulator 36 be of the type having a feedback line, also available from Norgren.

In the preferred embodiment, the pressurized qas is transported through one and one-half inch diameter furnace conduit 38.

Referring to FIGS. 3 and 4, the gas jets 42 preferably include an array of gas jet nozzles 24. The nozzles 24 are arranged to define a shape corresponding to a portion of the shape of the heated glass sheet. In this arrangement, one array 104 is mounted so that the distal end of the nozzles 24 are mounted generally in the range of 3-5 inches below the plane of conveyance of glass sheets G on horizontally extending rolls 18. Preferably, the nozzles 24 are horizontally spaced on a radius generally in the range of between 1 and 3 inches from each other. Most preferably, the nozzles 24 are spaced on a radius of generally 2 inches.

Referring to FIGS. 5 and 6, each nozzle 24 has a preferable length at least as long as 10 diameters of its circular bore. Preferably, circular bore 26 has a diameter generally in the range of between $\frac{1}{8}$ inch to $\frac{1}{4}$ inch. Most preferably, bore 26 has a diameter of 3/16 of an inch. A chamfered recess 28 at an inlet end 29 of each nozzle 24 is generally in the range of between 20-35 degrees with respect to the circular bore 26 to affect a non-turbulent flow transition of the pressurized gas from the source 27 into the bore. This chamfered recess 28 is most preferably 27 degrees. Additional details of the gas jet nozzles 24 are disclosed in U.S. application Ser. No. 475,823 which is entitled "Air Jet Nozzle and Array for Lifting Glass Sheets", and which is commonly owned by Glasstech, Inc. of Perrysburg, Ohio.

Depending on the particular shape desired, a plurality of arrays are employed to provide lifting and forming gas pressure upon the lower surface of the glass sheet G during the bending process. Referring again to FIG. 4, arrays 104 and 106 are designed to supply lifting and forming pressure to the upstream and downstream wing portions of the glass, respectively. Array 108 is designed to provide gas pressure generally in the center of the glass sheet, and array 110 has been configured to provide additional nozzles for pressure needed during the pick-up of the glass sheet from the conveyor. Additional arrays (not shown) may be provided at critical locations for particular surfaces, such as where inverse contours must be formed in a complex shaped part such as, for example, at the location designated at dashed lines 112.

Referring to FIG. 7, the computer control 32 is preferably programmed to provide a unique profile of varying gas pressure to each array of gas jet nozzles 104–110. A set of variables corresponding to process time intervals and pressure levels may be preset by the system operator for each array of gas jet nozzles 104–110 at the initial set-up of the furnace 10.

In the preferred embodiment, each of the preselected time intervals is calculated from an event in the glass sheet bending process that is also sensed by the computer. For example, E1 corresponds to the time at which the remotely controlled pressure regulator 36 is open to induce pressure in the supply lines 38. This event is controlled by the computer 32 through its signal to the electrical-to-pressure converter 34, and may be initiated upon receipt by the computer of position information indicating that the heated glass sheet has reached a preselected position in advance of the bending station 14. Similarly, E2 represents the start of the vacuum on the upper mold 22, E3 represents the opening of the hot valve 40, E4 corresponds to when the lower mold (not shown) starts moving into position underneath the upper mold 22, and E5 represents when the lower mold and upper mold are vertically actuated to press the glass sheet G therebetween. E6 is the time at which the hot valve 40 is turned off, again by a signal from the computer 32, and E7 represents when the mold 22 begins to drop the glass sheet to the transport ring upon completion of the press bending of the glass sheet.

The preprogrammed time-pressure sequence is preferably initiated for each of the gas jet nozzle arrays 104–110 when a position sensor (not shown) signals to the computer that a glass sheet has moved into position in the bending station 14 on the conveyor 20, represented by event E2 in FIG. 7. It should be noted that prior to the time when the glass sheet has reached the position on the conveyor 20 at which the bending process is to commence, the computer 32 has signalled the system to charge the lines in the heat exchanger with a nominal (5 psi) pressure, noted by the positive pressure levels indicated on each of the time-pressure lines between events E1 and E2.

Referring first to the time-pressure line for the pick-up jet array 110, a Pick-up Jets Soft Lift Pressure (LPS) of 40 psi is generated for a Soft Lift Time (SLT) of one second. The Pick-up Jet Full Up Pressure (LDF) of 40 psi is then generated until the lapse of Pick-up Jet On Time (PJT) which is set for an interval of eight seconds from the point in time when the lower mold starts to press (ES). The hot valve 40 is then shut-off upon the lapse of a Hot Jet Turn Off Delay (HJD) time of 1.5 seconds.

Referring to the time-pressure line for the center jets 108, Center Jets Soft Lift Pressure (LCS) of 34 psi is generated for a Soft Lift Time for Pick-up (SLT) interval of one second. The Center Jets Full Up Pressure (LCF) of 49 psi is then generated until lapse of the Center Jet Reduction Time (CJRT) interval of two seconds, which is measured from the time at which the lower mold begins moving into position under the upper mold, at E4. After lapse of a Cross Bend Reduction Jet Delay (CBD) of 0.1 second, a Center Jet's Cross Bend Abatement Pressure (LCC) of 17 psi is generated for a Cross Bend Reduction Jet On Time (CBT) of four seconds. This pressure abates any sagging of the bent glass sheet as it is deposited on the transport ring for transport to the next station.

Referring to the time-pressure line for the upstream wing jet nozzle array 106, an Upstream Jets Soft Lift Pressure (LUS) of 28 psi is generated for an Upstream Soft Lift Time (USLT) of six seconds. The Upstream Jets Full Up Pressure (LUF) of 38 psi is then generated until lapse of the Upstream Wing Jet On Time (UJT), which is six seconds from the time at which the lower mold begins to press, E5.

Referring now to the time-pressure line for the downstream wing jet nozzle array 104, a Downstream Jet's Soft Lift Pressure (LDS) of 23 psi is generated during the Downstream Soft Lift Time (DSLT) of six seconds. A Downstream Jet's Full Up Pressure (LDF) of 36 psi is then generated until lapse of the Downstream Wing Jet On Time (DJT) which is six seconds from the time at which the lower mold starts to press, E5.

Referring now to the time-pressure line for a set of inverse bend jets, which are not shown, but which may, for example, be located below the site of an inverse bend in the glass sheet's surface, such as the area generally indicated by the dashed lines 112 in FIG. 4. An Inverse Jet Soft Lift Pressure (LIS) of 37 psi is generated for a Soft Lift Time For Pick-up (SLT) of one second, after which an Inverse Jet Full Up Pressure (LIF) of 37 psi is generated. It should be noted that while the particular example illustrates identical Inverse Jets Soft Lift Pressure (LIS) and Inverse Jet Full Up Pressure (LIF), one or both of these pressure variables may be programmed to different values depending upon the shape of the part. The Inverse Jet Full Up Pressure continues until lapse of the Center Jet Reduction Time (CJRT), set at two seconds from the point in time when the lower mold begins to move into position underneath the upper mold, E4. After a Cross Bend Reduction Jet Delay (CBD) of 0.1 second (beginning from the time at which the upper mold 22 starts to drop the bent glass sheet, E7), an Inverse Jet's Cross Bend Abatement Pressure (LIC) may be generated for a Cross Bend Reduction Jet On Time (CBT) of a preset duration.

It will be appreciated by those skilled in the art that various different preselected pressure values may be desirable for corresponding preselected time intervals depending on the particular part configuration and the bending process.

The disclosures of all the aforementioned patents are hereby incorporated by reference into the disclosure of the present variable pressure gas jet system.

While the best modes for carrying out the invention have been described in detail, those familiar with the art to which this invention relates will recognize various alternative designs and embodiments for carrying out the invention as described by the following claims.

What is claimed is:

1. In a glass sheet press bending system including a furnace having a heating chamber for heating glass sheets, a conveyor for conveying the glass sheets in a generally horizontally extending orientation, and an upper forming mold located above the conveyor and having a downwardly facing curved surface, a variable pressure gas jet system for lifting the glass sheet upwardly by the impingement of gas flow from the conveyor to the upper forming mold, the system comprising:

control means including at least one output for providing electrical signals corresponding to preselected pressures; and a plurality of arrays, each of said arrays including, a converter including a first input connected to the output of the control means for receiving the electrical signal from the control means, a second input connected to means for supplying pressurized gas and an output for providing pressurized gas at a pressure which varies as a function of the value of the electrical signal received in the first input, a gas flow regulator including a first input connected to the converter for receiving the pressurized gas transmitted from the converter output, a second input connected to means for supplying pressurized gas, and a first output for providing pressurized gas at a pressure which varies as a function of the value of the pressurized gas received at the first input, and gas jet means connected to the gas flow regulator for directing the pressurized gas from the output of the gas flow regulator to the lower surface of the glass sheet.

2. The variable pressure gas jet system of claim 1 wherein the control means is a computer having memory for storing data corresponding to a plurality of preselected profiles of varying pressures for each of said arrays, and logic means for monitoring selected operating conditions in the glass sheet press bending system, and upon the occurrence of such selected conditions, determining the desired pressure for each of said arrays according to the preselected profile for that array, generating a control signal corresponding to that pressure for that array, and transmitting the control signal to the output of the control means for that array, whereby each array is independently and simultaneously controlled to provide varying pressure during the glass sheet press bending process.

* * * * *

UNITED STATES PATENT AND TRADEMARK OFFICE
CERTIFICATE OF CORRECTION

PATENT NO. : 5,147,439
DATED : September 15, 1992
INVENTOR(S) : Gregory Ritz

It is certified that error appears in the above-indentified patent and that said Letters Patent is hereby corrected as shown below:

Column 5, line 9, "gas" should be ---gas---.
Column 6, line 32, delete "(LDF)" and insert ---(LPF)---.
Column 6, line 36, delete "(ES)" and insert ---(E5)---.

Signed and Sealed this

Seventh Day of February, 1995

Attest:

BRUCE LEHMAN

*Attesting Officer*  *Commissioner of Patents and Trademarks*